Jan. 15, 1957 W. P. LEAR ET AL 2,778,004
INSTRUMENT AID FOR AIRCRAFT RADIO NAVIGATION
Filed April 11, 1955 2 Sheets-Sheet 2
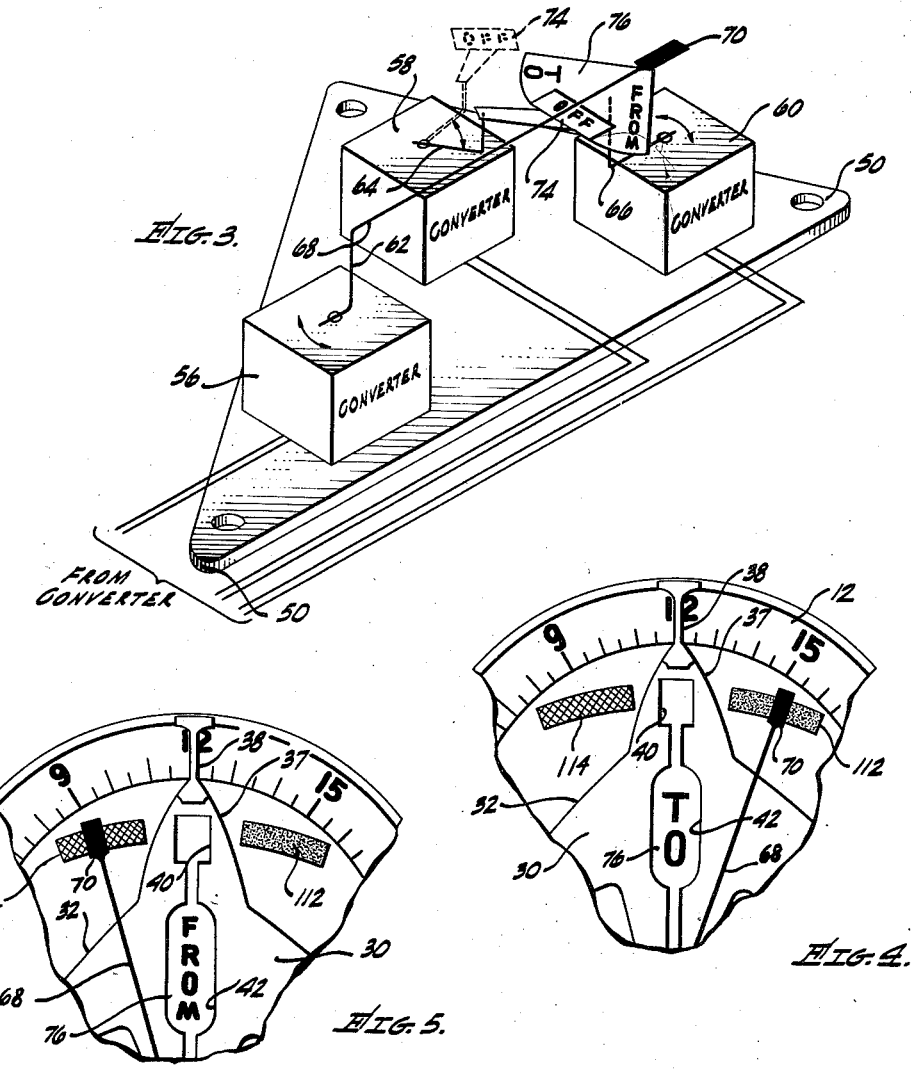
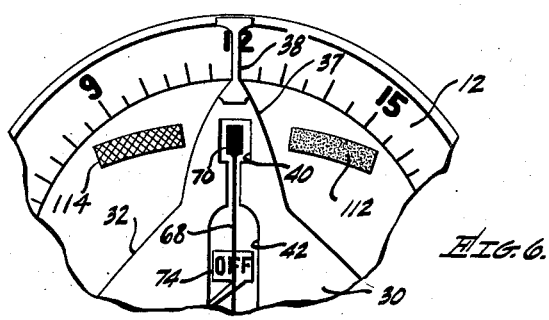
INVENTORS.
WILLIAM P. LEAR,
EDWARD F. O'BRIEN,
BY Perry E. Turner
AGENT.

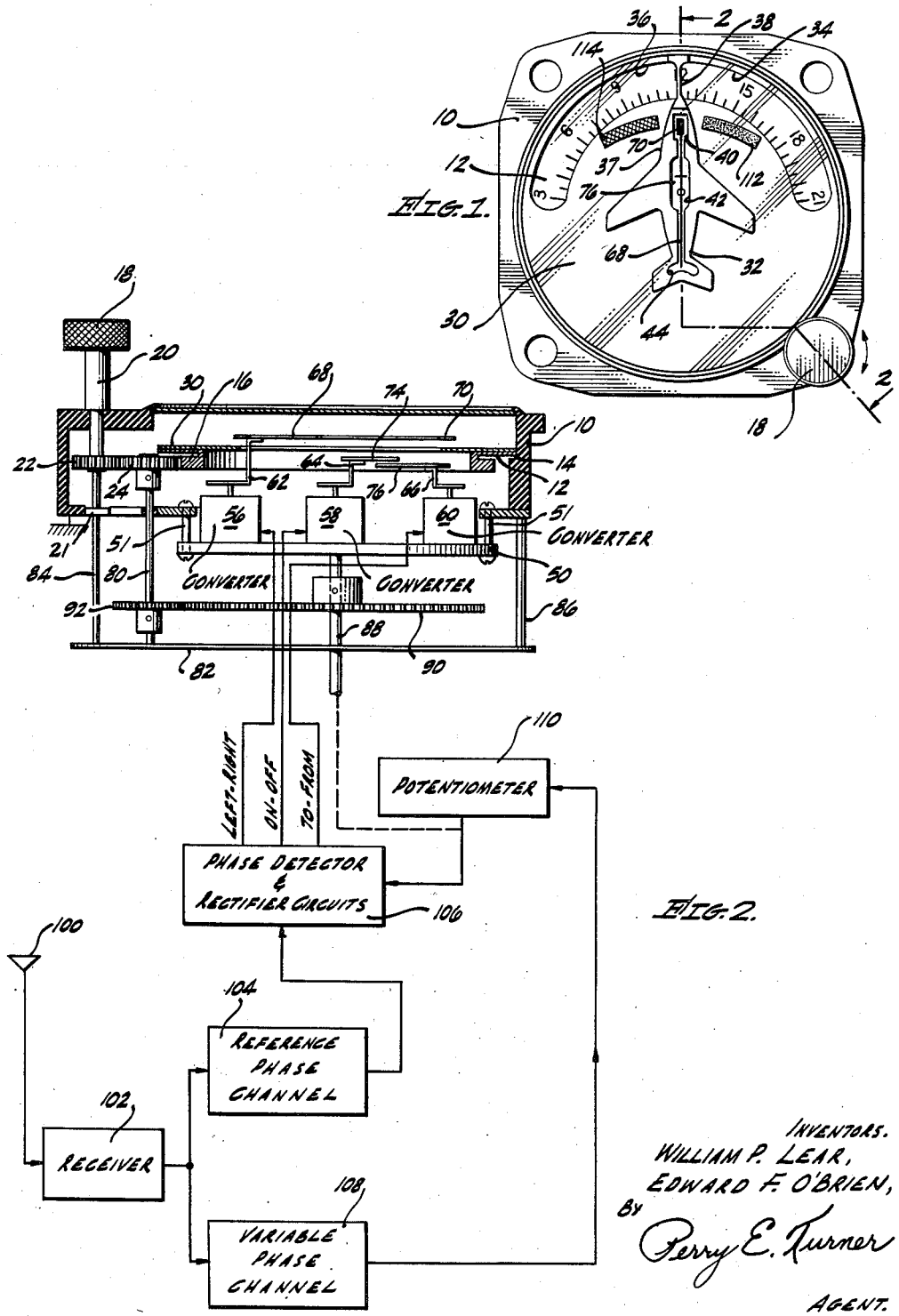

United States Patent Office 2,778,004
Patented Jan. 15, 1957

2,778,004

INSTRUMENT AID FOR AIRCRAFT RADIO NAVIGATION

William P. Lear, Pacific Palisades, and Edward F. O'Brien, Santa Monica, Calif., assignors to Lear, Incorporated, Santa Monica, Calif.

Application April 11, 1955, Serial No. 500,384

5 Claims. (Cl. 340—27)

This invention relates to instruments for aircraft, and more particularly to a single instrument to provide a pilot with information regarding the approach of his aircraft along a selected path to a signal source such as an omnirange transmitter station.

Prior to this invention, a pilot who set his aircraft for flight along a selected path or heading to an omnirange station has had to utilize separate instrument aids to determine whether he was on course and whether he was flying to or from the station. This of course has obvious disadvantages in that the pilot must keep shifting his attention between separate instruments to determine whether he is flying a selected heading, whether he is to the left or right of that heading, and whether he is approaching or flying away from the station. Furthermore, where signals received are so weak that the indicators do not operate to give proper indications of flight, the pilot may continue to rely on his instruments for some time before he finally realizes he has been relying on false indications.

It is an object of this invention to provide a single instrument to permit a pilot to select a desired heading for flight toward a source of signals, and by which he can ascertain at a glance whether the aircraft is flying directly along the selected heading and whether the aircraft is approaching or flying away from the source.

It is another object of this invention to provide a single indicating instrument for aircraft with which a desired heading can be selected and the pilot can quickly ascertain flight relative to such heading.

It is another object of this invention to provide a single indicating instrument with which a pilot can tell at a glance whether his aircraft is properly headed toward a source of signals, and which automatically gives visual warning when signals are too weak for proper operation of the instrument.

The above and other objects of this invention will become apparent when considering the following description in conjunction with the accompanying drawings, in which a preferred embodiment is illustrated by way of example. The scope of the invention is pointed out in the appended claims.

In the drawings,

Fig. 1 is a plan view of an aircraft radio navigation instrument in accordance with this invention;

Fig. 2 shows an elevation view, partly in section, taken along line 2—2 of Fig. 1, along with a block diagram of a signal receiving system with which the instrument is adapted to cooperate;

Fig. 3 is a perspective view of a portion of the instrument illustrated in Fig. 2, to aid in understanding this invention; and Figs. 4–6 are plan views of portions of the instrument of Fig. 1 to illustrate its operation as an aid for radio navigation.

Briefly, the indicator of this invention comprises a bearing selector which can be selectively rotated to place a desired heading marking opposite a marker or fiducial point to indicate the desired course or heading toward a station. A deviation pointer pivoted at one end is adapted to rotate to the right or left of the marker point to indicate whether the aircraft is to the left or right of the desired bearing. An indicator flag is adapted to be moved to present the words "To" and "From" for visual observation, depending upon whether the aircraft is flying toward or away from the station. A warning or alarm flag is adapted to be exposed to the view of the pilot when the control system for the instrument is not working.

Referring to Figs. 1 and 2, the instrument is supported in a housing 10 which is adapted to be fixed with respect to the frame of the aircraft. An omni-bearing or heading selector ring or card 12 is slidably supported at its edge on a ledge or shoulder 14. A boss 16 on selector 12 is provided with gear teeth about its peripheral surface. An external control knob 18 is fixed to a shaft 20 which is rotatably supported by a bearing member 21. A gear 22 is fixed to shaft 20, and an intermediate gear 24 engages both gear 22 and boss 16, whereby knob 18 can be rotated to position selector 12 as desired.

A stationary mask 30 is placed over the compass card 12 and an inscribed outline 32 of an aircraft in plan view is provided on mask 30 (Fig. 1). Mask 30 is provided with arcuate windows 34, 36 extending a short distance from the nose 37 of outline 32 to expose heading numbers on selector 12 a few degrees on either side of nose 37. The adjacent ends of windows 34, 36 are separated by a strip 38 of mask 30 which is sufficiently narrow to permit a heading number located thereunder to be viewed; further, this narrow section forms a pointed extension of nose 37 and, as will be made more evident hereafter, provides a reference or fiducial point or line.

A narrow rectangular window 40 in mask 30 is centered with respect to the nose 37 of outline 32, and the longitudinal centerline of window 40 is on the centerline of outline 32. A similar but larger rectangular window 42 is located approximately in the center of outline 32. An arcuate shaped slot 44 is disposed within the tail section of outline 32 and is symmetrically disposed about its centerline.

Referring to Figs. 2 and 3, a platform 50 is fixed to housing 10, as by bolts 51. Supported on platform 50 are three electro-mechanical converters 56, 58 and 60. Converters 56, 58 and 60 preferably are of the d'Arsonval movement type for converting D.-C. signals into pivotal movement of a mechanical member. The mechanical members for converters 56, 58, 60 are illustrated as respective L-shaped needles 62, 64, 66.

The upper end of needle 62 extends through the arcuate slot 44. Fixed at one end of to the upper end needle 62 is a "deviation" pointer 68. The other end of pointer 68 terminates in a widened finger 70. In the absence of D.-C. input signals to converter 56, needle 62 aligns pointer 68 with the centerline of outline 32 to position finger 70 in the center of window 40.

Needle 64 supports at its upper end an alarm flag 74 on which, as indicated in Fig. 3, the word "Off" may be inscribed. The upper end of needle 64 and flag 74 are below the mask 30. Converter 58 preferably is adapted to position needle 64 so that flag 74 appears at window 42 in the absence of D.-C. input signals, and to keep flag 74 away from opening 42, as indicated in dotted lines in Fig. 3, in the presence of a D.-C. signal.

Fixed to the upper end of needle 66, and also located below mask 30, is a sector-shaped flag 76. As indicated, the words "To" and "From" are inscribed along opposite sides of flag 76. Converter 60 is adapted to rotate needle 66 and flag 76 in response to input signals of one polarity so that the word "To" is brought in line with window 42. In response to signals of opposite polarity, converter 60 is adapted to rotate needle 66 to place the word "From" in window 42. In the absence of input signals, needle 66 is adapted to assume a position so that the words "To" and "From" are located on opposite sides of window 42 and neither word is exposed to view.

Gear 24 is supported on a shaft 80 which is pivotally mounted for rotation at its opposite end on a support 82 which is rigidly fixed to housing 10, as indicated by rods 84 and 86. A shaft 88 rotatably supported by platform 50 carries a gear 90 which has a diameter substantially equal to that of the boss 16 of selector 12. A gear 92 fixed to shaft 80 engages gear 90, whereby gear 90 is rotated in synchronism with selector 12 upon turning of control knob 18.

As previously indicated, the instrument of this invention is adapted for operation in conjunction with a system which is adapted to develop "on-off," "to-from" and "left-right" signals during the progress of an aircraft along a predetermined course or heading toward an omnirange transmitter station.

A typical system of the type referred to is illustrated in Fig. 2. Signals from the omnirange station are modulated by both a variable phase and a reference phase signal of the same frequency. These signals are impressed upon an antenna 100, and after the signals are amplified and detected in a receiver 102, a reference phase channel 104 coupled to the receiver extracts the reference phase signal and applies it to phase detector and rectifier circuits 106. Simultaneously, a variable phase channel 108 coupled to the receiver applies the variable phase signal to a potentiometer 110, and signals picked off from potentiometer 110 are applied to the phase detector and rectifier circuits 106. It will be recognized that the combination of the reference phase channel 104, variable phase channel 108, phase detector and rectifier circuits 106, and potentiometer 110 forms an omnirange converter. Such an omnirange converter is well known; an example of this type of converter is described in the publication, "V. H. F. Navigational Receiving Equipment" published by Aircraft Radio Corporation, Boonton, N. J., 1951. In such a converter, the variable phase signals are split to obtain quadrature signals which are applied at spaced points on the potentiometer resistor. A signal picked off the sliding contact of the potentiometer has a phase dependent upon the position of the sliding contact, and this signal is applied to detector and rectifier circuits in which the phases of the reference and variable signals are compared and three output voltages are developed. One output voltage is for "left-right" indications, one polarity indicating that the aircraft is flying to the left of the desired course and the opposite polarity indicating that it is flying to the right of the desired course; equal and opposite rectified signals result in zero voltage output when the aircraft is on course. Another voltage gives "to-from" indications, one polarity representing flight away from the station; the absence of such a voltage, either because the received signals are too weak or because the receiver is not operating, provides a null indication. The third and final output voltage is of one polarity which, while it is present, indicates that the receiver is operating, i. e., "on"; this voltage is zero or "off" otherwise.

Referring to Fig. 2, the "left-right" voltages are indicated schematically as being applied to converter 56; the "to-from" voltages are schematically indicated as being applied to converter 60; the "on-off" voltages are similarly indicated as being applied to the converter 58. The operation of deviation pointer 68, alarm flag 74 and the "to-from" indicator flag 76 in response to the respective voltages will now be described in connection with Figs. 4-6, along with Fig. 1.

With reference to Fig. 1, assume that the receiver 102 is operating and that strong signals are being received, whereby a D. C. signal is applied to converter 58 to cause the alarm flag 74 to be positioned out of sight under mask 30. Assume also that the transmitter station is determined to be at a heading of 120° and it is desired to fly toward the aircraft along that heading. Manipulation of control knob positions the number "12" of the heading selector under the fiducial line 38. Coincidentally, shaft 88 is rotated to place the sliding contact of potentiometer in a position corresponding to the position of the heading selector. If the aircraft is flying along this heading, the "left-right" signals are equal and opposite and no signal is applied to converter 56; accordingly, deviation pointer 68 will be positioned along the centerline of outline 32, with finger 70 centered in the rectangular window 40. If this course is being flown toward the station, the signal applied to converter 60 causes flag 76 to be positioned so that the word "To" is centered in the rectangular window 42.

If the aircraft veers to the right of the desired heading while it is flying toward the station, a D. C. signal of polarity representing this situation is applied to converter 56 to cause pointer 68 to be rotated to the right, as indicated in Fig. 4. A glance at the instrument shows the pilot that finger 70 is to the right of window 40, and he may then fly the plane to the left or get back on course, where finger 70 will be positioned in the center of window 42. To further aid the pilot, a strip 112 of suitable background coloring may be inscribed on mask 30 to the right of nose 37; a glance will reveal when the finger 70 masks part of the strip 112.

If the aircraft flies to the left of the desired course, a signal of opposite polarity is applied to converter 56 to cause deviation pointer 68 to swing to the left of center (see Fig. 5); again, a glance shows the pilot that finger 70 is positioned to the left, and this visual inspection also may be aided by providing an inscribed strip 114 of a desired color which will be partly covered when finger 70 is to the left. The pilot may then maneuver the aircraft to the right to get back on course.

If the aircraft passes over the station, a signal is applied to converter 60 which is opposite in polarity to that applied while the aircraft was flying toward the station. This causes converter 60 to rotate flag 76 so that the word "From" is centered in window 42 (see Fig. 5).

If the received signals are too weak or if the receiver is not operating, D. C. signals are removed from converters 56, 58 and 60. In this situation, deviation pointer 68 is centered with finger 70 centrally located in window 40. Further, flag 76 assumes a neutral position where the words "To" and "From" are positioned on opposite sides of window 42, as indicated in Figs. 3 and 6. The centering of finger 70 in window 42 also means the aircraft is flying on the desired course when the receiver is operating, and the pilot may not notice immediately that the "To–From" indicator is inoperative and may think he is flying correctly. However, and to warn the pilot that this is not the case, the absence of a D. C. signal input to converter 58 causes alarm flag 74 to assume its neutral position wherein the word "Off" is centered in rectangular window 42. This provision immediately alerts the pilot that he should not rely on the instrument.

For the purpose of making the movements of the various indicators more readily apparent to the observer, any desired colors may be used. For example, in the usual case where mask 30 is black, outline 32 and the fiducial line or strip 38 may be yellow; alarm flag 74 may be bright red with "Off" inscribed therein in black letters; strips 112 and 114 may be light pastel colors; finger 70 of deviation pointer 68 may also be bright red to make it readily apparent when it is positioned over either of strips 112, 114 or in the center of window 40.

It will be obvious that certain markings may be eliminated, such as outline 32 and strips 112 and 114. In fact, the words "To" and "From" need not be used, it being necessary only that suitable contrasting indicia be provided on card 76 to inform the observer whether flight is to or from a station.

From the foregoing it will be apparent that this invention provides a vastly improved instrument aid with which different items of information for aircraft radio navigation can be obtained from a glance at a single instrument.

What is claimed is:

1. An instrument aid for use in aircraft radio navigation comprising: a rotatable bearing selector, said bearing selector being a ring-shaped member with heading markings on one surface adjacent its periphery, a fiducial marker adjacent said one surface, manual control means for rotating said bearing selector to align a desired heading marking with said fiducial marker, a deviation pointer adjacent said one surface, first electro-mechanical means coupled to said pointer and operable to receive D.-C. signals to rotate said pointer, said first means in the absence of D.-C. signals holding said pointer in a neutral position in which it is aligned with said fiducial marker and said desired heading marking, said first means responding to first D.-C. signals of one sense to rotate said pointer to the right of said marker and responding to D.-C. signals of opposite sense to rotate said pointer to the left of said marker, a "To-From" indicator flag said indicator flag being located within said bearing selector and substantially parallel to said one surface thereof, second electro-mechanical means to receive second D.-C. signals, said second means being coupled to said indicator flag, and said second means being operative in the presence of said second D.-C. signals of one sense to rotate said indicator flag to a first position and in the presence of said D.-C. signals of opposite sense to rotate said indicator flag to a second position, said indicator flag in said first position presenting a "To" indication to view at a predetermined location, said indicator flag in said second position presenting a "From" indication to view also at said predetermined location.

2. An instrument aid for use with the type of aircraft radio navigation system utilizing a receiver and omnirange converter to develop a first D.-C. signal representing the deviation of the aircraft from a predetermined heading toward an omnirange transmitter station, a second D.-C. signal representing the flight of the aircraft relative to the station, and said instrument aid comprising: an omni-bearing selector, said selector being manually rotatable to present to view a number indication of the predetermined heading, a deviation pointer, said pointer being adapted for pivotal movement, first electro-mechanical control means for said pointer, said first control means being responsive to the first D.-C. signal to cause said pointer to be aligned with said number indication when the aircraft is in flight along the predetermined heading and to assume a position at one side of said number indication when the aircraft flies to that side of the predetermined heading, a "To-From" indicator flag, said flag having respective indicia thereon which provide "To" and "From" indications, second electro-mechanical control means for said indicator flag, said second control means being responsive to the second D.-C. signal of one sense to rotate said indicator flag to present one of said indicia to view at a predetermined location, and in response to the second D.-C. signal of opposite sense to rotate said indicator flag to present the other indicia to view at said predetermined location, whereby to provide an indication of the flight of the aircraft relative to the station.

3. As an article of manufacture, an instrument for use in aircraft radio navigation comprising: an omni-bearing selector ring card, said card having bearing markings on one surface adjacent its periphery, a mask adjacent said one surface, said mask having a cut-out portion to expose a portion of the marking-bearing surface of said card to view, said card having a boss of reduced diameter fixed to its opposite surface, a manually rotatable shaft, gear means coupling said shaft and said boss to effect rotation of said card in response to rotation of said shaft, a support in fixed spaced relation to said card, first, second and third electro-mechanical converters mounted on said support, said first, second and third converters supporting respective needle members for pivotal movement, said mask having a first opening to receive one end of the needle associated with said first converter, said mask bearing a reference mark aligned with the center of the cut-out portion thereof, a deviation pointer fixed at one end to said one end, the needle associated with said first converter having a neutral position in which said pointer is aligned with and in close proximity to said reference mark and the center of said cut-out portion, an alarm flag supported on the needle associated with said second converter, said mask having a second opening through which said alarm flag can be viewed when its supporting needle is in a neutral position, a "To-From" indicator flag supported on the needle associated with said third converter, and the supporting needle for said indicator flag being movable between first and second positions in which the respective "To" and "From" indications on said indicator flag can be viewed through said second opening.

4. The combination defined in claim 3, wherein said cut-out portion comprises a pair of arcuate windows, and said reference mark is formed by the portion of said mask which separates said windows.

5. The combination defined in claim 4, wherein said first and second openings are aligned with the separating portion of said mask and with each other.

References Cited in the file of this patent
UNITED STATES PATENTS

| | | |
|---|---|---|
| 2,424,570 | Jenks | July 29, 1947 |
| 2,671,208 | Lamb | Mar. 2, 1954 |
| 2,699,539 | Sylvander | Jan. 11, 1955 |